(12) United States Patent
Owens et al.

(10) Patent No.: US 11,744,234 B2
(45) Date of Patent: Sep. 5, 2023

(54) AQUARIUM SYSTEM AND METHODS TO INCREASE LIGHT INTENSITY DUE TO MOTION

(71) Applicant: Spectrum Brands, Inc., Middleton, WI (US)

(72) Inventors: Stanley James Owens, Oak Park, CA (US); Joseph Michael Flora, Simi Valley, CA (US); Chad William Robbins, Moorpark, CA (US)

(73) Assignee: Spectrum Brands, Inc., Middleton, WI (US)

( * ) Notice: Subject to any disclaimer, the term of this patent is extended or adjusted under 35 U.S.C. 154(b) by 262 days.

(21) Appl. No.: 16/282,521

(22) Filed: Feb. 22, 2019

(65) Prior Publication Data

US 2019/0261607 A1    Aug. 29, 2019

Related U.S. Application Data

(60) Provisional application No. 62/634,606, filed on Feb. 23, 2018.

(51) Int. Cl.
*A01K 63/06* (2006.01)
*A01K 63/04* (2006.01)

(52) U.S. Cl.
CPC .............. *A01K 63/06* (2013.01); *A01K 63/04* (2013.01)

(58) Field of Classification Search
CPC ...... A01K 63/06; A01K 63/04; A01K 63/006; A01K 63/00; A01K 663/003
USPC ......................................................... 119/264
See application file for complete search history.

(56) References Cited

U.S. PATENT DOCUMENTS

| | | | | |
|---|---|---|---|---|
| 5,015,994 A | * | 5/1991 | Hoberman | G08B 13/193 340/567 |
| 7,585,092 B2 | * | 9/2009 | Huffman | F21S 6/003 362/198 |
| 8,727,554 B2 | | 5/2014 | Blake | |
| 9,504,235 B2 | * | 11/2016 | Tang | A01K 63/06 |
| 10,156,581 B1 | * | 12/2018 | Cho | H05B 47/115 |
| 2005/0034677 A1 | * | 2/2005 | Blake | A01K 63/006 119/266 |
| 2006/0271340 A1 | * | 11/2006 | Levine | A01K 63/06 702/188 |
| 2007/0171647 A1 | * | 7/2007 | Artwohl | F25D 27/005 362/276 |

(Continued)

OTHER PUBLICATIONS

Rodney Nagy, Rodney Nagy Salty Critter Aquarium, Dec. 29, 2003 (Year: 2003).*
Rodney Nagy, Salty Critter Aquarium, Dec. 2003 (Year: 2003).*

*Primary Examiner* — Brady W Frazier
*Assistant Examiner* — Zoe Tam Tran
(74) *Attorney, Agent, or Firm* — Merchant & Gould P.C.

(57) ABSTRACT

An aquarium system includes a tank, a motion sensor, and a light source. The motion sensor is adapted to sense motion within a predetermined distance from the tank. The light source has a controllable intensity projecting light into the tank. The intensity varies responsive to motion sensed by the motion sensor. When the motion sensor senses movement, the light is on at 100% intensity. After some period of no-motion, such as about 60 seconds, the lighting slowly dims to around 20% of full brightness. When it senses movement again, the lighting slowly ramps up to 100% intensity.

20 Claims, 3 Drawing Sheets

(56) References Cited

U.S. PATENT DOCUMENTS

| | | | | |
|---|---|---|---|---|
| 2008/0012465 A1* | 1/2008 | Bolta | ............... | H01J 61/44 |
| | | | | 313/486 |
| 2008/0290816 A1* | 11/2008 | Chen | ............... | A01K 63/06 |
| | | | | 315/294 |
| 2008/0316732 A1* | 12/2008 | Blake | ............... | A01K 63/06 |
| | | | | 362/101 |
| 2009/0091540 A1* | 4/2009 | Doan | ............ | G01C 21/3664 |
| | | | | 345/173 |
| 2011/0062888 A1* | 3/2011 | Bondy | ............ | H05B 45/3725 |
| | | | | 315/294 |
| 2012/0020060 A1* | 1/2012 | Myer | ............... | F21S 8/085 |
| | | | | 362/183 |
| 2012/0055413 A1* | 3/2012 | Kim | ............... | A01K 63/006 |
| | | | | 119/251 |
| 2012/0079755 A1* | 4/2012 | Torres | ............... | A01K 97/02 |
| | | | | 43/17.5 |
| 2012/0143381 A1* | 6/2012 | Lawyer | ............ | A01K 63/02 |
| | | | | 700/282 |
| 2014/0159615 A1* | 6/2014 | Grajcar | ............ | A01K 1/00 |
| | | | | 315/307 |
| 2014/0305376 A1* | 10/2014 | Lutz | ............... | A01K 63/003 |
| | | | | 119/267 |
| 2014/0336263 A1* | 11/2014 | Krebs | ............ | A01M 29/00 |
| | | | | 514/627 |
| 2015/0163888 A1* | 6/2015 | Fredricks | ............ | H05B 47/19 |
| | | | | 119/51.04 |
| 2016/0081311 A1* | 3/2016 | Simeoli | ............ | A01K 63/042 |
| | | | | 119/264 |
| 2016/0183502 A1* | 6/2016 | Tanase | ............ | A01K 61/00 |
| | | | | 119/267 |
| 2018/0192621 A1* | 7/2018 | Valatka | ............ | A01K 63/045 |
| 2020/0344858 A1* | 10/2020 | Ashdown | ............ | H05B 47/105 |

* cited by examiner

AQUARIUM SYSTEM AND METHODS TO INCREASE LIGHT INTENSITY DUE TO MOTION

CROSS REFERENCE TO RELATED APPLICATION

This application claims priority to U.S. Provisional patent application Ser. No. 62/634,606, filed Feb. 23, 2018, incorporated herein by reference in its entirety.

TECHNICAL FIELD

This disclosure concerns an aquarium system. In particular, this disclosure concerns an aquarium system including a motion sensor and a light source, and methods of use.

BACKGROUND

Aquarium systems are used for keeping live fish as pets. Aquarium systems are desirable that allow for the visual display of fish.

One problem with aquariums is algae. Algae growth is undesirable, as it clouds the view of the fish and leads to the need for more frequent cleaning. Some aquarium systems include ways to fight algae growth, but while fighting algae growth, they also have the disadvantage of startling and stressing the fish.

Therefore, there is a need for an aquarium system that allows for the visual display of fish, while minimizing algae growth, and without startling or stressing the fish.

SUMMARY

An aquarium system is provided that improves the prior art. In example systems, the aquarium system will help to minimize the growth of algae; allow for the visual display of the fish; and will prevent the startling or stressing of the fish.

In one example, an aquarium system is provided including an aquarium tank; a motion sensor adapted to sense motion within a predetermined distance from the aquarium tank; and a light source with a controllable intensity projecting light into the aquarium tank. The intensity will vary responsive to the motion sense to by the motion sensor.

The controllable intensity can include a no-motion intensity and a motion intensity. The no-motion intensity is less than 50% of the motion intensity. The light source projects light into the aquarium tank at the no-motion intensity until motion is sensed by the motion sensor. When the motion sensor senses motion, the intensity is changed from the no-motion intensity to the motion intensity for a predetermined time.

In one example, the no-motion intensity is less than 30% of the motion intensity.

In another example, the no-motion intensity is less than 25% of the motion intensity. In some examples, the light source projects white light.

In some examples, at the motion intensity, the light source cycles through projecting light of at least two different colors.

In certain examples, at the motion intensity, the light source projects light cycling through the colors of any of: red, green, orange, purple, blue, or pink.

In some examples, the intensity changes from no-motion intensity to motion intensity in less than 30 seconds.

In some embodiments, the intensity changes from no-motion intensity to motion intensity in 1-10 seconds.

In some systems, a level of the no-motion intensity and motion intensity are settable by an application executable on a mobile device.

In some systems, the predetermined distance is settable by an application executable on a mobile device.

In some examples, the predetermined time is settable by an application executable on a mobile device.

In some implementations, the colors of the light are settable by an application executable on a mobile device.

In one or more embodiments, the motion sensor is mounted above the tank.

In some examples, the light source is mounted above the tank.

In some implementations, there is a cabinet holding the tank, and the light source is secured to the cabinet over the tank. The motion sensor is secured to the cabinet above the light source and the tank.

In a further aspect, a method of lighting an aquarium system is provided. The method includes projecting light into an aquarium tank at a first intensity until motion is sensed within a predetermined distance of the tank. Upon sensing motion within the predetermined distance, there is a step of increasing an intensity of the light to a second intensity for a predetermined time.

In some example methods, the step of increasing an intensity includes increasing the intensity to the second intensity by more than three times of the first intensity.

In some examples, after the step of increasing intensity, there is a step of cycling the projecting light through more than one color.

In examples that include cycling the projecting light, the step can include cycling the light through the colors of any of red, green, orange, purple, blue, or pink.

In some examples, the step of projecting light includes projecting white light.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the examples disclosed herein are based.

DETAILED DESCRIPTION

Figure 1:
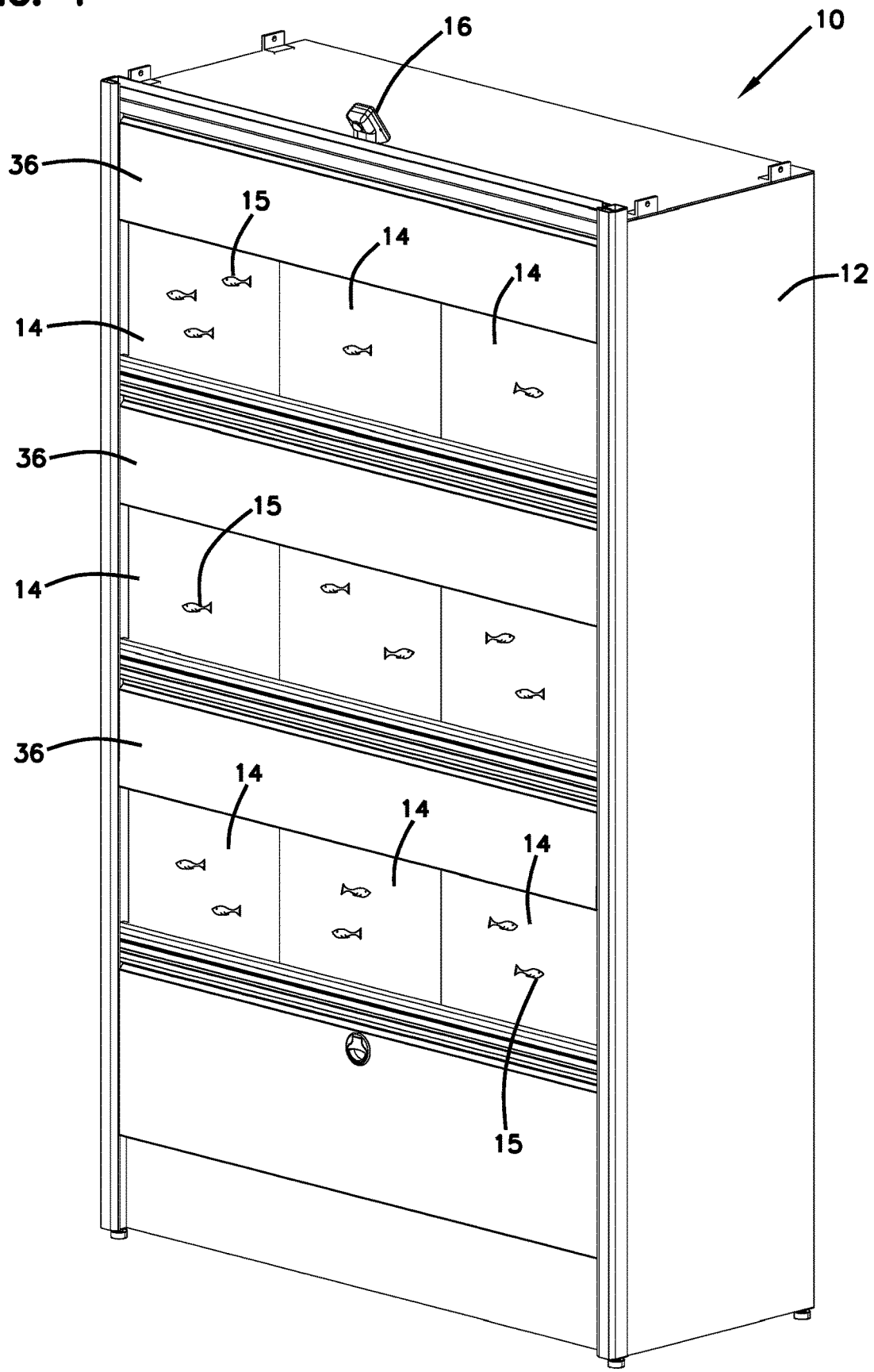
FIG. 1 is a perspective view of one embodiment of an aquarium system constructed in accordance with principles of this disclosure.

Various examples will be described in detail with reference to the drawings, wherein like reference numerals represent like parts and assembly throughout the several views. Reference to various examples does not limit the scope of the claims attached hereto. Additionally, any examples set forth in this specification are not intended to be limiting and merely set forth some of the many possible examples for the appended claims.

FIG. 1 illustrates an aquarium system 10. While the aquarium system 10 can be embodied in many different forms, in the example shown in FIG. 1, a cabinet 12 is provided. The cabinet 12 holds at least one, and in this example, several aquarium tanks 14. The cabinet 12 with the several tanks 14 would be typical in a retail situation, such as a pet store selling fish 15.

The aquarium system 10 further includes a motion sensor 16. The motion sensor 16 is adapted to sense motion within a predetermined distance from the aquarium tank 14.

The motion sensor 16 can be mounted any convenient place in which it will detect motion within the desired predetermined distance from the tank 14. In the example shown in FIG. 1, the motion sensor 16 is mounted above the tank 14. In particular, in the example of FIG. 1, the motion sensor 16 is secured to the cabinet 12 above all of the tanks 14. Many other embodiments for locating the motion sensor 16 are possible.

Figure 2:
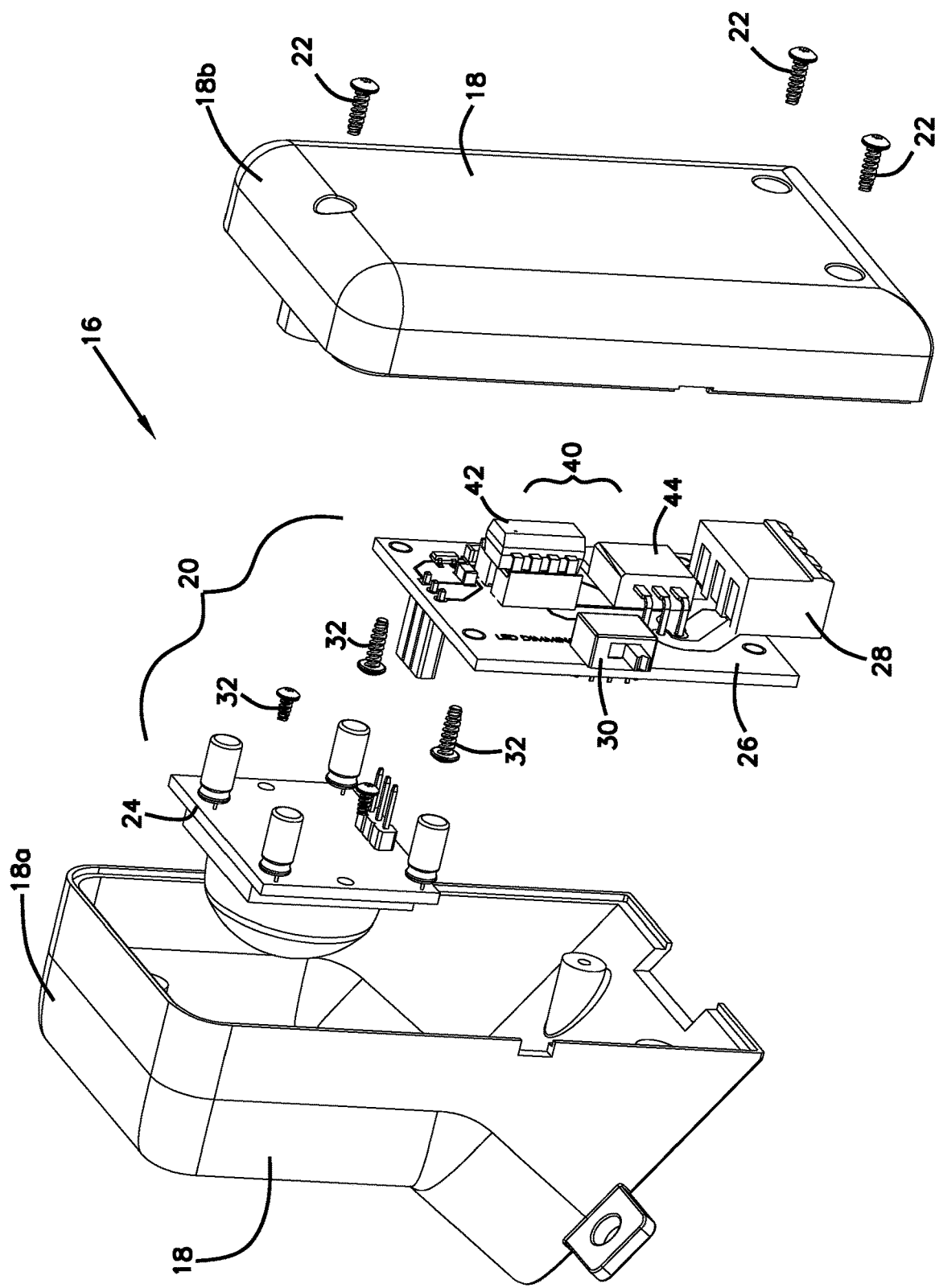
FIG. 2 is an exploded, perspective view of a motion sensor and components for use with the aquarium system of FIG. 1.

FIG. 2 is an exploded perspective view of the motion sensor 16. Many different embodiments are possible. In this embodiment, the motion sensor 16 includes an outer housing 18 (shown, in this embodiment, in two pieces 18a and 18b) enclosing components 20. Fasteners 22 allow the two housing pieces 18a and 18b, which together form the housing 18 to be removably connected together and enclose the internal components 20.

The electronic parts of the internal components 20 include a motion sensor module 24. A circuit board 26 is included as part of the internal components. On the circuit board 26 is a dimmer 40. The dimmer 40 provides for dimming of a light source 34 (FIG. 3), and includes, in this embodiment, a microcontroller 42 and a MOSFET 44. The MOSFET 44 is a metal-oxide-semiconductor field-effect transistor. The circuit board 26 also holds a wire connector 28 and a switch 30. The switch 30 is usable to control the dimmer 40.

The internal components 20 also include fasteners 32 for holding the motion sensor module 24 and circuit board 26 in place within the housing 18.

Figure 3:
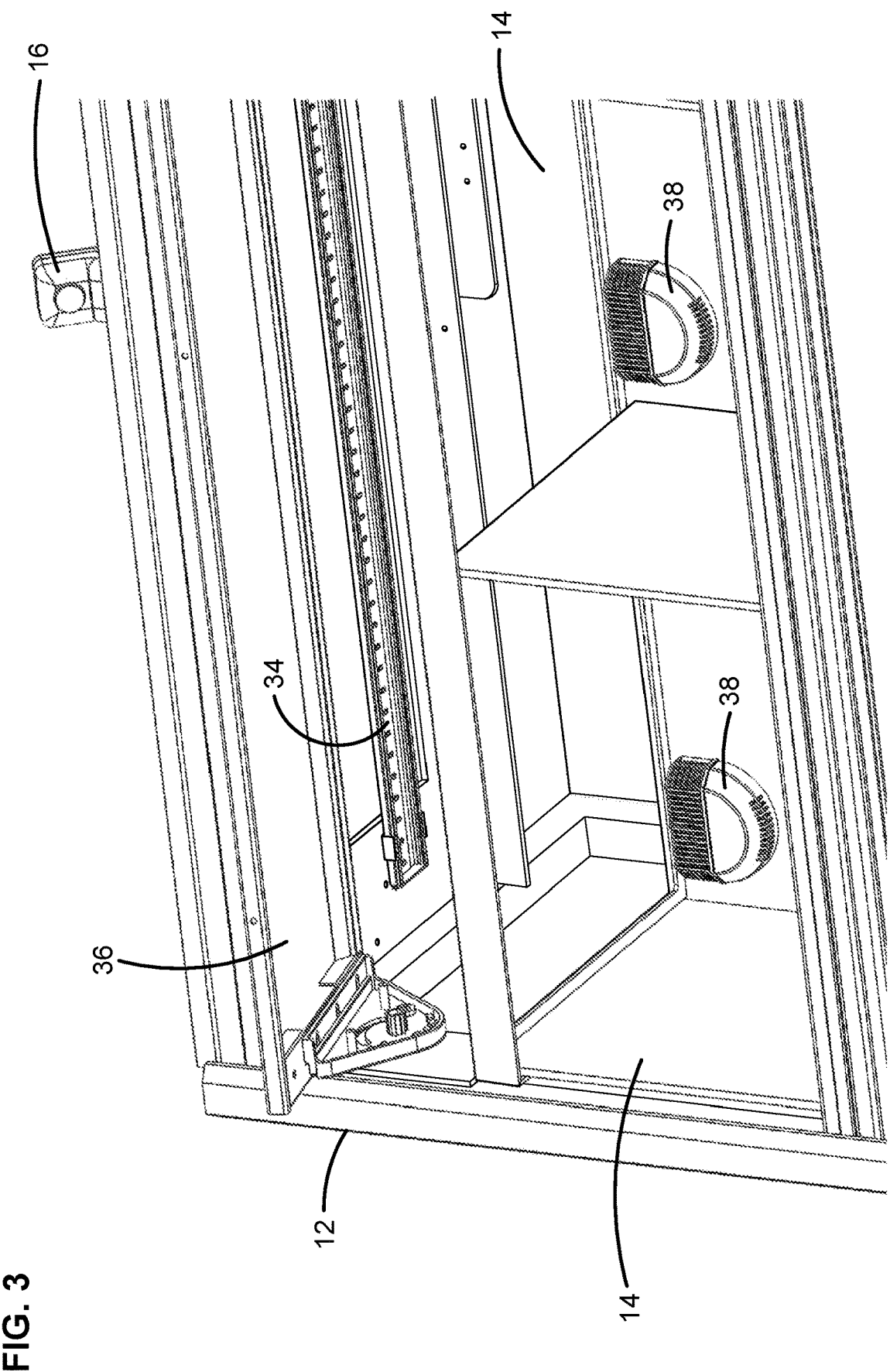
FIG. 3 is a partial perspective view of internal components of the aquarium system of FIG. 1.

In accordance with principles of this disclosure, the system 10 further includes light source 34 (FIG. 3). The light source 34 has a controllable intensity projecting light into the aquarium tank 14. The intensity varies responsive to motion sensed to by the motion sensor 16.

The light source 34 can be standard, white light. In other situations, the light source 34 can project light of different colors, as explained further below.

In reference now to FIG. 3, a perspective view of a portion of the system 10 is illustrated. The view in FIG. 3 is of an upper portion of the cabinet 12 of FIG. 1. A door 36 is shown pivoted from the closed position of FIG. 1 to the open position of FIG. 3. When the door 36 is pivoted to its open position, the light source 34 is visible within the cabinet 12. The light source 34 is mounted in the cabinet 12 in a position to be above the aquarium tanks 14 such that they project light downwardly into the tanks 14. The motion sensor 16 can be seen secured to the cabinet 12 above both the light source 34 and the tanks 14. The light source 34 is illustrated, in this embodiment, between the tanks 14 and the motion sensor 16.

Also visible in FIG. 3 is a surface skimmer 38, located in each tank 14. The surface skimmer 38 is useful for maintaining water clarity.

In accordance with principles of this disclosure, the controllable intensity of the light source 34 includes at least two intensities: a first, or "no-motion" intensity; and a second, or "motion" intensity. The first, or no-motion, intensity is typically less than 50% of the second, or motion, intensity. The light source 34 projects light into the aquarium tank 14 at the no-motion intensity until motion is sensed by the motion sensor 16. When the motion sensor 16 senses motion, the intensity is changed from the first (no-motion) intensity to the second (motion) intensity for a predetermined time. The predetermined time can be a matter of a few minutes, such as 15 minutes or less, including 5 minutes or less, or 1 minute or less; or anywhere from 5-20 minutes. The predetermined time can be adjusted to be a desired time by the person owning the system 10.

After sensing movement by the motion sensor 16, the light source 34 would be on at the second (motion) intensity at a 100%. After some period of no movement, e.g. about a minute, the intensity of the light source 34 slowly dims to less than 30% of the second intensity, for example less than 25%, and in many examples to about 20% of its full brightness at the second intensity. When it senses movement again, the intensity of the light source 34 slowly ramps up to 100 percent. By increasing and decreasing the intensity or brightness of the light source 34 slowly, the fish are not stressed or startled. In addition, this can contribute to substantial energy savings. Further, it considerably minimizes algae growth, therefore reducing required maintenance on the system 10.

In many examples, the intensity changes from the first (no-motion) intensity to the second (motion) intensity in less than 30 seconds. For example, the intensity can change from no-motion intensity to motion intensity in 1-10 seconds.

As mentioned previously, the light source 34 can project white light; alternatively, it may cycle through projecting light of at least two different colors. For example, the light source 34 can project light cycling through the colors of any or all of: red, green, orange, purple, blue, or pink. In certain applications, the color of the light can highlight the appearance of the aquatic animals or fish.

Certain selective parameters can be settable by an application executable on a mobile device. These selected parameters can include any one or all of: the brightness or intensity of the light source 34; the predetermined distance detectable by the motion sensor 16; the predetermined time that the light is on in the second (motion) level intensity; and the particular colors of the light. In addition, these parameters can be settable as part of a connected aquarium as described in PCT Publication WO 2017/015359, Application PCT/US2016/043120, which is incorporated herein by reference in its entirety.

The system 10 can be used as a part of a method of lighting an aquarium system. The method includes projecting light into an aquarium tank 14 at the first intensity until motion is sensed within a predetermined distance of the tank. For example, the predetermined distance can be a few feet such as 10 feet or less. In other examples, the predetermined distance can be 0-5 feet; or 0-2 feet.

Upon sensing motion within the predetermined distance, the method includes increasing the intensity of the light to the second intensity for a predetermined time.

The step of increasing the intensity can include increasing the intensity to the second intensity by more than three times the first intensity.

The step of increasing the intensity can include cycling the projecting light through more than one color. The step of cycling the projecting light can include cycling the light through colors of any or all of: red, green, orange, purple, blue, or pink.

The step of projecting light can further include projecting white light.

The above represents example principles. Many embodiments can be made using these principles.

We claim:

1. An aquarium system comprising:
   (a) a cabinet comprising a plurality of aquarium tanks;
   (b) a motion sensor mounted to the cabinet and adapted to sense motion within a predetermined distance from the plurality of aquarium tanks; and
   (c) a plurality of fixed light sources, wherein at least one of the plurality of fixed light sources is mounted above each aquarium tank and activated in response to the motion sensor when motion is sensed within the predetermined distance; the light source having a controllable intensity of light brightness, in which the controllable intensity can be decreased resulting in a dimming of brightness of the light source;
   wherein the light source is configured to project light into the plurality of aquarium tanks and control or vary said controllable intensity of the light responsive to motion sensed by the motion sensor that provides for said dimming of brightness of the plurality of fixed light sources; the plurality of fixed light sources being constructed and arranged to vary said controllable intensity to minimize algae growth and prevent stressing fish in the plurality of aquarium tanks;
   wherein the controllable intensity includes a no-motion intensity and a motion intensity, and wherein,
   (i) the no-motion intensity being a light brightness less than 50% of light brightness of the motion intensity;
   (ii) the plurality of fixed light sources is configured to project light into the plurality of aquarium tanks at the no-motion intensity until motion is sensed by the motion sensor;
   (iii) the plurality of fixed light sources is configured to gradually change the controllable intensity from the no-motion intensity to the motion intensity in less than 30 seconds to result in the motion intensity being maintained for a predetermined time, when the motion sensor senses motion.

2. The aquarium system of claim 1 wherein the no-motion intensity is less than 30% of the motion intensity.

3. The aquarium system of claim 1 wherein the no-motion intensity is less than 25% of the motion intensity.

4. The aquarium system of claim 1 wherein the plurality of fixed light sources projects white light.

5. The aquarium system of claim 1 wherein at the motion intensity, the plurality of fixed light sources projects light cycling through the colors of any of: red, green, orange, purple, blue, or pink.

6. The aquarium system of claim 1 wherein the plurality of fixed light sources is configured to change the intensity from no-motion intensity to motion intensity in 1-10 seconds, when the motion sensor senses motion.

7. The aquarium system of claim 1 wherein a level of the no-motion intensity and motion intensity are settable by an application executable on a mobile device.

8. The aquarium system of claim 1 wherein the predetermined distance is settable by an application executable on a mobile device.

9. The aquarium system of claim 1 wherein the predetermined time is settable by an application executable on a mobile device.

10. The aquarium system of claim 5 wherein the colors of the light are settable by an application executable on a mobile device.

11. The aquarium system of claim 1 wherein the motion sensor is mounted above the plurality of aquarium tanks.

12. The aquarium system of claim 1 wherein the plurality of fixed light sources is mounted above the plurality of aquarium tanks.

13. The aquarium system of claim 1 the motion sensor is secured above the plurality of fixed light sources and the plurality of aquarium tanks.

14. A method of lighting an aquarium system, the method comprising:
   (a) providing a motion sensor within a predetermined distance of an aquarium tank;
   (b) projecting light from a fixed light source into the aquarium tank directed at fish in the aquarium tank at a first intensity;
   (c) sensing motion within the predetermined distance; and
   (d) gradually increasing the intensity of the light from the first intensity to a second intensity for a predetermined time;
      wherein the second intensity is at least 3 times greater than the first intensity; and both the first intensity and second intensity minimize algae growth and prevent stressing fish in the aquarium tank.

15. The method of claim 14 further including a step of cycling the light through more than one color.

16. The method of claim 14 wherein the step of projecting light includes projecting white light.

17. The aquarium system of claim 1, wherein the predetermined time is from 5 to 20 minutes.

18. The method of claim 14, wherein the predetermined time is from 5 to 20 minutes.

19. The aquarium system of claim 1, wherein at the motion intensity, the fixed light source cycles through projecting light of at least two different colors.

20. An aquarium system comprising:
   (a) a cabinet comprising a plurality of aquarium tanks;
   (b) a motion sensor mounted to the cabinet and adapted to sense motion within a predetermined distance from the plurality of aquarium tanks; and
   (c) a plurality of fixed light sources, wherein at least one of the plurality of fixed light sources is mounted to each aquarium tank and activated in response to the motion sensor when motion is sensed within the predetermined distance; the plurality of fixed light sources having a controllable intensity of light brightness, in which the controllable intensity can be decreased resulting in a dimming of brightness of the plurality of fixed light sources;
   wherein the plurality of fixed light sources is configured to project light into the plurality of aquarium tanks and control or vary said controllable intensity of the light brightness responsive to motion sensed by the motion sensor;
   wherein the controllable intensity includes a no-motion intensity and a motion intensity, and wherein,
   (i) the plurality of fixed light sources is configured to project light into the plurality of aquarium tanks at the no-motion intensity until motion is sensed by the motion sensor; and
   (ii) the plurality of fixed light sources is configured to gradually change the controllable intensity from the no-motion intensity to the motion intensity.

* * * * *